UNITED STATES PATENT OFFICE.

FRANK H. NORTON, OF NEW YORK, N. Y.

IMPROVED MEDICAL COMPOUND.

Specification forming part of Letters Patent No. 43,128, dated June 14, 1864.

*To all whom it may concern:*

Be it known that I, FRANK H. NORTON, of the city of New York, State of New York, have invented a new and useful remedy, which I call "Anti-Diphtherion," for the cure of sore-throat, ulcerated sore-throat, diphtheria, quinsy, and other inflammatory diseases of the throat, tonsils, palate, and larynx; and I declare the following to be a full, clear, and exact description thereof and of the manner of preparing and administering the same.

First. Prepare an infusion of one ounce of sumac-berries (*Rhus glabrum*) in a pint of boiling water, and then add of alum, six drams (ʒvi;) of saltpeter, three drams (ʒiii;) of honey, three fluid ounces (fʒiii.) Then, for the purpose of preventing fermentation, I add one fluid ounce (fʒi) of acetic acid or any other acid which will answer the same purpose. These ingredients are to be well mixed and strained, and then bottled.

The dose for an adult is one tea-spoonful taken internally every one or two hours, according to the severity of the case, and gargled before being swallowed. For children, smaller proportionate quanties are to be given.

What I claim as my own invention, and desire to secure by Letters Patent, is—

1. The remedy anti-diphtherion, compounded of sumac-berries, alum, saltpeter, and honey, in the proportions and manner set forth.

2. The use of acetic or other acid, in combination with the materials set forth, for the purpose of preventing fermentation.

FRANK H. NORTON.

Witnesses:
 OSCAR A. TAYLOR,
 CHAS. MORRILL.